Patented June 16, 1953

2,642,364

UNITED STATES PATENT OFFICE 2,642,364

MAT FINISH ENAMELS FOR ALUMINUM

William R. Beatty, Highlands, N. J., and Oliver A. Short, Staten Island, N. Y., assignors to E. I. du Pont de Nemours & Company, Wilmington, Del., a corporation of Delaware No Drawing. Application May 23, 1950, Serial No. 163,796

8 Claims. (Cl. 106—49)

This invention relates to the enamelling of aluminum and aluminum-rich alloys and particularly to vitreous enamel compositions for use in providing aluminum and aluminum-rich alloys with vitreous enamel coatings having a mat finish.

Aluminum and aluminum-rich alloys are well suited for many purposes because of their strength and lightness. Attempts have been made to broaden the field of use of such materials by providing them with vitreous enamel coatings to provide surfaces of attractive appearance and which are resistant to weathering and other chemical action and adhere well to the metal. Insofar as is known, all enamel compositions previously suggested for application to aluminum surfaces have provided glossy coatings, but for many uses mat coatings are desired. The present invention is concerned with compositions which when applied to the surfaces of aluminum or aluminum-rich alloys provide vitreous enamel finishes having a mat appearance well suited for many uses for which glossy coatings are undesirable or unsatisfactory.

It is an object of the invention to provide vitreous enamel compositions for application to aluminum and aluminum-rich alloys which provide enamel coatings having a mat finish. A particular object is the provision of compositions which yield mat finish vitreous enamel surfaces on aluminum which are particularly well suited for architectural and other uses where a glossy finish is unsatisfactory. These and further objects will be apparent from the following description of the invention.

The above objects are accomplished in accordance with the invention by the present enamel compositions which comprise mixtures of an enamel flux of a composition hereinafter defined, with a refractory material or a mixture of refractory materials in an amount corresponding to 12 to about 50% based on the weight of the flux. The subject compositions are obtained by mill-blending the enamel flux with one or more highly refractory materials, i. e., materials which are insoluble in the flux at its fusing and maturing temperatures. Such compositions, when applied to aluminum or aluminum-rich alloy surfaces and fired at a temperature of about 493° C. and higher, e. g., 500 to 550° C., produce attractive mat finish coatings which are useful for many purposes.

Enamel fluxes which are usable to produce the present mat finish enamel compositions are described in Deyrup Patent 2,467,114. They have a low firing and maturing temperature, e. g., of 493° C. and higher, and contain the following ingredients in the proportions indicated:

| | Mole per cent |
|---|---|
| Lead oxide (PbO) | 10 to 18 |
| Silica ($SiO_2$) | 38 to 65 |
| Lithium oxide ($Li_2O$) | 5 to 12 |
| Sodium oxide ($Na_2O$) | 0 to 22 |
| Potassium oxide ($K_2O$) | 0 to 20 |
| Titanium oxide ($TiO_2$) | 0 to 11 |

The total alkali metal oxide content $$(Li_2O + Na_2O + K_2O)$$

of the enamel composition must be between 25 and 36 mole per cent, and the ratio of the silica content, or the silica content plus twice the titanium oxide content, of the composition, in mole per cent, to the total alkali metal oxide content, in mole per cent, must be between 1.8 and 3.0, i. e., $$\frac{SiO_2 + 2TiO_2}{Li_2O + Na_2O + K_2O} = 1.8 \text{ to } 3.0$$

In the event that no portion of the silica content is replaced with titanium oxide, the formula, of course, becomes $$\frac{SiO_2}{Li_2O + Na_2O + K_2O} = 1.8 \text{ to } 3.0$$

Preferably, the flux used in preparing the present compositions will contain a substantial amount of titanium oxide as a melted-in constituent. Amounts up to about 20 mole per cent may be used advantageously, the preferred and most preferred amounts being, respectively, 12 to 16 and 13 to 15 mole per cent. Accordingly, the titanium oxide ($TiO_2$) content of the flux may be varied within the range 0 to 20 mole per cent, the preferred and most preferred amounts being as stated above. The presence of 12 to 20 mole per cent is distinctly advantageous in that such amounts increase substantially the resistance of the coating to acidic materials and also facilitate the obtainment of the desired mat finish. Amounts greater than about 20 mole per cent are not recommended since such greater amounts tend to cause undesirable devitrification. Regardless of the amount of $TiO_2$ used in the flux, the ratio of the sum of the $SiO_2$ content plus twice the $TiO_2$ content to the sum of the contents of $Li_2O$, $Na_2O$ and $K_2O$ should be within the range 1.8 to 3.0 as stated above, which range is critical.

Limited amounts of constituents other than those indicated above as being essential may in some cases be present in the flux, provided the ranges of the essential constituents be maintained as stated. Thus, up to 5 mole per cent cobalt oxide may be added to the flux batch to provide a transparent blue enamel without affecting the adherence of the final enamel to aluminum. Small amounts of antimony oxide are occasionally useful to inhibit or obviate undesirable staining resulting from traces of organic material. When used, the amounts of $Sb_2O_3$ will usually be within the range 0.3 to 5 mole per cent, 0.4 to about 3 mole per cent being preferred.

The enamel fluxes or frits used in preparing the final enamel compositions are prepared as described in the Deyrup patent by mixing the weighed batch ingredients and heating them in a crucible until the mix is completely melted to a homogeneous glass. Crucible temperatures may vary widely but 900 to 1200° C. are generally suitable. The molten glass is then fritted by running into water which shatters it into small pieces forming the frit. The frit is then dried and ground in a ball-mill, or other mill, with water or other suitable liquid to produce the flux which is used in the present compositions. The frit may be ground separately, as indicated, or a mixture of the frit with the refractory material in the required proportions may be ground to produce the present compositions directly. If the frit is separately ground, then a mixture of the ground frit together with the proper amount of refractory material is ground together to produce the composition which yields the present mat finish enamel.

In application of these mat finish compositions, the ground mixture of enamel flux with the milled-in refractory material is dispersed in a suitable vehicle for application to the aluminum or aluminum alloy by well-known spraying, dipping, stencilling or brushing procedures, being in this respect similar to the enamels of the above patent. After being applied to the aluminum, the coated article is then fired.

It is preferred that the aluminum surface first be coated with a ground coat enamel of the Deyrup type, which enamel will contain none of the refractory materials present in the final cover coat. The ground coat is then fired after which the final coat of the composition yielding the mat finish is applied and fired. The firing temperature for either coating will generally be in the range 500 to about 550° C.

The aluminum surface being enameled should of course be free of dirt, grease or corrosion products. Preferably, the surface is pretreated according to the method of the pending application of Deyrup and Peterson, Serial No. 758,470, filed July 1, 1947 and issued March 6, 1951 as U. S. Patent 2,544,139, which pretreatment involves treatment with an aqueous alkaline solution of a chromate, followed by a heat-treatment at a temperature between 350° C. and the temperature at which the aluminum or alloy is deleteriously affected by heat, usually about 600° C. The time of contact with the treating solution is usually about 1 to 30 minutes and the time of heating at the temperature indicated is about 2 to 10 minutes. The treating solution may have any degree of alkalinity between about pH 8 to 14 and should have a chromate content of from 0.25 to 25% by weight, expressed as potassium chromate. Any water-soluble chromate, including dichromates, may be used in preparing the treating solution, the alkali metal chromates being preferred. The required alkalinity of the solution may be obtained by the addition of agents such as the alkali metal hydroxides, carbonates or bicarbonates and the like. This pretreatment is very effective in producing enamel-coated aluminum which is free from water-spalling.

When enamel fluxes of the above Deyrup patent are mill-blended with 12 to 50% and preferably 15 to 35%, based on the weight of the flux, of a refractory material, or mixtures of such materials, compositions result which yield final enamels on aluminum having a mat finish useful for a variety of purposes. Such surfaces are desirable for many decorative and other purposes, e. g., for the production of enamelled aluminum architectural panels for interior and exterior uses, and for sign structures, for which purposes a glossy enamel may often be entirely unsatisfactory. The mat texture of the enamel surfaces may of course be varied as required for specific uses by varying the amount and kind of refractory material incorporated in the enamel composition. Refractory materials generally may be used, examples of which are flint, clay, alumina, Florida kaolin and feldspar. Such materials should be finely divided. Flint of particle size of around 300 to 325 mesh and air-floated clay are generally satisfactory as to particle size. When flint is used, amounts ranging to as high as 50% of the weight of the flux may be used in some instances whereas when clay is used, amounts exceeding about 40% are generally not recommended. Mixtures of refractory materials may be used and in many cases are desirable. In specifying certain ranges for the refractory materials, any refractory pigment which is added as a mill-addition agent should be counted as a refractory material together with other refractory materials such as flint or clay. The amount of pigment used may be varied but usually will range from about 1 to 15%. The total amount of all such refractory materials should not exceed 50% of the weight of the flux, otherwise important properties of the enamel are destroyed or adversely affected. Also the content of refractory materials should be at least 12% of the weight of the flux in order that the final enamel have a substantial mat appearance.

Illustrative of the use of a mixture of refractory materials in compositions which provide coatings having properties especially suitable for a specific use are compositions comprising mill blends of a flux of the type indicated above with 1 to 20% of flint, 2 to 20% of clay and 3 to 20% of a refractory pigment, these amounts being preferably 5 to 10%, 5 to 10% and 5 to 12%, respectively, the total of the three materials being within the range 12 to 40% and preferably 15 to 35%, based on the weight of the flux. Such compositions when applied to aluminum or aluminum-rich alloys yield surfaces admirably well suited for chalkboard use. Ordinarily, for such applications a green pigment is desired, a pigment consisting of a mixture of chromium cobalt aluminate, chrome cobalt silicate and lead antimonate being illustrative.

In the following examples the ground coat enamel had the following composition although any of the flux compositions indicated previously can be used satisfactorily: 33.8% PbO, 27.6% $SiO_2$, 13.5% $TiO_2$, 13.7% $Na_2O$, 2.2% $LiO_2$, 2.2% $K_2O$, 2.7% $Sb_2O_3$ and 4.4% BaO by weight. (The corresponding mole percentages are: 13.4%, 40.4%, 14.9%, 19.5%, 6.5%, 2.0%, 0.8% and 2.5% respectively.) The enamel flux used in the cover coating had the following composition: 37.4%

PbO, 30% SiO$_2$, 12.7% TiO$_2$, 13.8% Na$_2$O, 2.3% Li$_2$O, 2.3% K$_2$O and 1.6% Sb$_2$O$_3$. (The corresponding mole percentages are: 14.5%, 43.3%, 13.7%, 19.1%, 6.7%, 2.2% and 0.5%, respectively.)

In all of the following examples, the aluminum stock was cleaned by immersion in a 6% solution of sulfuric acid in water containing 0.25% of sodium lauryl sulfonate for 15 to 30 min. at room temperature, then washed thoroughly. The clean stock was pretreated in a water solution containing 0.2% chromic sulfate, 19.0% potassium dichromate, and 3.8% sodium hydroxide, at 50° C. for 4 minutes. The stock was washed thoroughly with water until the washings ran free of yellow chromate coloration and then heated in a furnace at 540° C. for at least 4 minutes. The stock was then cooled and a slip of the ground coat was sprayed on, following which the coated stock was fired at about 540° C. This slip was prepared by ball-milling with water the frit for the ground coat with 10% of a mill-addition agent containing 34% KOH, 26% water glass and 39% boric acid. After firing the ground coat a cover coat slip was sprayed on over the ground coat and then fired at about 540° C. This latter slip was prepared by ball-milling with water the cover coat flux with the desired refractory material, including pigment, and also with 10% of the mill-addition agent mentioned above.

Sheets of aluminum alloys 3S and 61S were coated with the enamel compositions of the following examples. The 3S alloy contains 1.2% manganese, the balance being aluminum. The 61S alloy contains 0.25% copper, 0.6% silicon, 1% magnesium, 0.25% chromium, the balance being aluminum. Castings, for example of alloy 43 (5% silicon, 95% aluminum), can also be coated successfully with these compositions to obtain mat finish enamel coatings.

Example 1

|  | Parts |
|---|---|
| Frit | 100 |
| Chrome cobalt silicate pigment | 3 |
| Flint (325 mesh) | 18 |
| TiO$_2$ | 1 |
| Mill-addition agent | 7.5 |

The above cover coat gave a light green semi-mat grain finish suitable for use for store front panels.

Example 2

|  | Parts |
|---|---|
| Frit | 100 |
| Chrome-zinc-titanium-tin oxide brown | 1 |
| Titanium oxide | 6 |
| Vallender clay | 5 |
| Mill-addition agent | 7.5 |

The above cover composition gave an ivory colored enamel having a slight mat texture useful architecturally for simulating ceramic tile.

Example 3

|  | Parts |
|---|---|
| Frit | 100 |
| Flint (325 mesh) | 30 |
| Iron-chrome-cobalt oxide black | 10 |
| Mill-addition agent | 7.5 |

The above cover coat gave a satin black finish suitable for use as a telephone dial plate.

Example 4

|  | Parts |
|---|---|
| Frit | 100 |
| Iron-chrome-cobalt oxide pigment | 10 |
| Alumina | 7 |
| Flint | 8 |
| Mill-addition agent | 7.5 |

The above cover coat gave an enamel having a mat black finish.

Example 5

|  | Parts |
|---|---|
| Frit | 100 |
| Chrome cobalt silicate | 3 |
| Lead antimonate | 3 |
| Chrome cobalt zinc aluminate | 5 |
| Air floated clay | 8 |
| Flint | 8 |
| Mill-addition agent | 7.5 |

The above composition gave a mat green enamel having surface properties well suited for chalkboard use.

Example 6

|  | Parts |
|---|---|
| Frit | 100 |
| Chromium cobalt silicate | 5 |
| Chromium cobalt zinc aluminate | 1 |
| Air-floated clay | 6-8 |
| Flint (325 mesh) | 8 |
| Mill-addition agent | 7.5 |

This cover coat gave a green mat enamel finish.

In all of the above examples the parts shown are parts by weight.

The present compositions may be employed successfully in providing mat enamels on surfaces of aluminum or aluminum-rich alloys, i. e., alloys containing up to 20% of alloying ingredients such as manganese, magnesium, copper, chromium, zinc and silicon, the balance being aluminum. One of the chief difficulties heretofore encountered in enamelling such surfaces has been the obtainment of adequate adherence of the enamel to the aluminum surface due to the relatively great difference between the linear thermal coefficients of expansion. The present enamel compositions have surprisingly good adherence to such aluminum surfaces even though their coefficient of expansion is only about two thirds that of aluminum and the coatings can be subjected to considerable mechanical abuse without any danger of spalling or cracking off of the vitreous coating. This excellent adherence is indeed surprising considering the large amounts of refractory materials present. Another important characteristic of the present compositions is that they have low firing and maturing temperatures as previously indicated which render them particularly well suited for application to aluminum and aluminum-rich alloys, and yield enamel coatings having a high degree of resistance to chemical attack.

Ordinarily it is preferred that a ground coat of an enamel flux of a composition of the type indicated, which ground coat is free from or substantially free from milled-in refractory materials, be applied before the final cover coat is applied. The flux for the ground coat may be the same as for the cover coat, or may differ therefrom if desired. If any refractory material is milled in with the flux for the ground coat, the amount thereof generally will not exceed about 7% of the weight of the flux. The use of a ground coat is not essential but is generally preferred.

We claim:
1. A vitreous enamel composition suitable for the coating of aluminum and aluminum-rich alloys to provide a mat enamel finish thereon which comprises an enamel flux and 12 to 50%, based on the weight of said flux, of a refractory material added as a mill-addition agent, said flux comprising:

| | Mole per cent |
|---|---|
| PbO | 10 to 18 |
| $SiO_2$ | 38 to 65 |
| $Li_2O$ | 5 to 12 |
| $Na_2O$ | 0 to 22 |
| $K_2O$ | 0 to 20 |
| $TiO_2$ | 0 to 20 |
| $Sb_2O_3$ | 0 to 5 | the total alkali metal oxide content $$(Li_2O + Na_2O + K_2O)$$

of said flux being between 25 and 36 mole per cent, and the ratio of the sum of said silica content and twice the said titanium oxide content of the flux to said total alkali metal oxide content being between 1.8 and 3.0, all of said oxides being melted into said flux composition.

2. A composition according to claim 1 wherein the $TiO_2$ content of the flux is 12 to 20 mole per cent.

3. A composition according to claim 1 wherein the refractory material includes a refractory pigment.

4. A composition according to claim 1 wherein the content of refractory material is 15 to 35% based on the weight of the flux.

5. A composition according to claim 1 wherein the refractory material is predominantly flint.

6. A composition according to claim 1 wherein the refractory material is predominantly a mixture of flint and clay.

7. A composition according to claim 1 wherein the refractory material comprises 1 to 20% of flint, 2 to 20% of clay and 3 to 20% of a ceramic pigment, based on the weight of the flux, said amounts of flint, clay and pigment totalling 12 to 40% of the weight of the flux.

8. A composition according to claim 1 wherein the amounts of flint, clay and pigment total 15 to 35% of the weight of the flux and are, respectively, 5 to 10%, 5 to 10% and 5 to 12%.

WILLIAM R. BEATTY.
OLIVER A. SHORT.

References Cited in the file of this patent

UNITED STATES PATENTS

| Number | Name | Date |
|---|---|---|
| 495,629 | Giessler | Apr. 18, 1893 |
| 2,300,454 | Lucas | Nov. 3, 1942 |
| 2,311,039 | Emery | Feb. 16, 1943 |
| 2,475,470 | Bennett et al. | July 5, 1949 |
| 2,467,114 | Deyrup | Apr. 12, 1949 |

FOREIGN PATENTS

| Number | Country | Date |
|---|---|---|
| 638,710 | Germany | 1936 |

OTHER REFERENCES

American Ceramic Society: Transactions, vol. XIV, pp. 701 and 702 (1912).